(12) United States Patent
Patry

(10) Patent No.: US 10,083,718 B1
(45) Date of Patent: Sep. 25, 2018

(54) SYSTEMS AND METHODS FOR EDITING VIDEOS BASED ON MOTION

(71) Applicant: GOPRO, INC., San Mateo, CA (US)

(72) Inventor: Jean Patry, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 27 days.

(21) Appl. No.: 15/468,721

(22) Filed: Mar. 24, 2017

(51) Int. Cl.
| G11B 27/00 | (2006.01) |
| H04N 5/93 | (2006.01) |
| G11B 27/031 | (2006.01) |
| G06K 9/00 | (2006.01) |
| H04N 5/14 | (2006.01) |

(52) U.S. Cl.
CPC ........ *G11B 27/031* (2013.01); *G06K 9/00758* (2013.01); *H04N 5/144* (2013.01)

(58) Field of Classification Search
CPC .......................... G11B 27/031; G06K 9/00758
See application file for complete search history.

(56) References Cited

U.S. PATENT DOCUMENTS

| 5,130,794 | A  | 7/1992  | Ritchey |
| 6,337,683 | B1 | 1/2002  | Gilbert |
| 6,593,956 | B1 | 7/2003  | Potts |
| 7,222,356 | B1 | 5/2007  | Yonezawa |
| 7,483,618 | B1 | 1/2009  | Edwards |
| 8,446,433 | B1 | 5/2013  | Mallet |
| 8,611,422 | B1 | 12/2013 | Yagnik |
| 8,718,447 | B2 | 5/2014  | Yang |
| 8,730,299 | B1 | 5/2014  | Kozko |
| 8,763,023 | B1 | 6/2014  | Goetz |
| 8,910,046 | B2 | 12/2014 | Matsuda |
| 8,988,509 | B1 | 3/2015  | Macmillan |
| 9,032,299 | B2 | 5/2015  | Lyons |
| 9,036,001 | B2 | 5/2015  | Chuang |
| 9,077,956 | B1 | 7/2015  | Morgan |
| 9,111,579 | B2 | 8/2015  | Meaney |
| 9,142,253 | B2 | 9/2015  | Ubillos |
| 9,151,933 | B2 | 10/2015 | Sato |
| 9,204,039 | B2 | 12/2015 | He |
| 9,208,821 | B2 | 12/2015 | Evans |

(Continued)

FOREIGN PATENT DOCUMENTS

| WO | 2001020466 | 3/2001 |
| WO | 2009040538 | 4/2009 |

OTHER PUBLICATIONS

Ricker, "First Click: TomTom's Bandit camera beats GoPro with software" Mar. 9, 2016 URL: http://www.theverge.com/2016/3/9/11179298/tomtom-bandit-beats-gopro (6 pages).

(Continued)

*Primary Examiner* — Hung Dang
*Assistant Examiner* — Girumsew Wendmagegn
(74) *Attorney, Agent, or Firm* — Sheppard Mullin Richter & Hampton LLP

(57) ABSTRACT

Motion within first video content and second video content may be assessed. A match between the motions assessed within the first video content and the second video content may be determined. The match may including a first set of video frames within the first video content and a second set of video frames within the second video content within which the matching motion is present. A first video portion (including frame(s) of the first set of video frames) of the first video content and a second video portion (include frame(s) of the second set of video frames) of the second video content may be identified based on the match. The first video portion and the second video portion may be concatenated to provide a transition between the first video portion and the second video portion in which continuity of motion may be achieved.

18 Claims, 9 Drawing Sheets

(56) References Cited

U.S. PATENT DOCUMENTS

| | | |
|---|---|---|
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 2004/0128317 A1 | 7/2004 | Sull |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balasubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |
| 2017/0006214 A1 | 1/2017 | Andreassen |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

(56) References Cited

OTHER PUBLICATIONS

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., Deep Compression: Compressing Deep Neural Networks with Pruning, Trained Quantization and Huffman Coding, International Conference on Learning Representations 2016, 14 pgs.

He et al., "Deep Residual Learning for Image Recognition," arXiv:1512.03385, 2015, 12 pgs.

Iandola et al., "SqueezeNet: AlexNet-level accuracy with 50x fewer parameters and <0.5MB model size," arXiv:1602.07360, 2016, 9 pgs.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Ioffe et al., "Batch Normalization: Accelerating Deep Network Training by Reducing Internal Covariate Shift," arXiv:1502.03167, 2015, 11 pgs.

Parkhi et al., "Deep Face Recognition," Proceedings of the British Machine Vision, 2015, 12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

PCT International Search Report and Written Opinion for PCT/US2015/023680, Oct. 6, 2015, 13 pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, Dec. 17, 2015, 7 Pages.

Schroff et al., "FaceNet: A Unified Embedding for Face Recognition and Clustering," IEEE Conference on computer Vision and Pattern Recognition (CVPR), 2016, 10 pgs.

Tran et al., "Learning Spatiotemporal Features with 3D Convolutional Networks", arXiv:1412.0767 [cs.CV] Dec. 2, 2014 (9 pgs).

Yang et al., "Unsupervised Extraction of Video Highlights Via Robust Recurrent Auto-encoders" arXiv:1510.01442v1 [cs.Cv] Oct. 6, 2015 (9 pgs).

Ernoult, Emeric, "How to Triple Your YouTube Video Views with Facebook", SocialMediaExaminer.com, Nov. 26, 2012, 16 pages.

PCT International Search Report and Written Opinion for PCT/US15/18538, Jun. 16, 2015, 26 pages.

PCT International Search Report for PCT/US17/16367 dated Apr. 14, 2017 (2 pages).

PCT International Search Reort for PCT/US15/18538 dated Jun. 16, 2015 (2 pages).

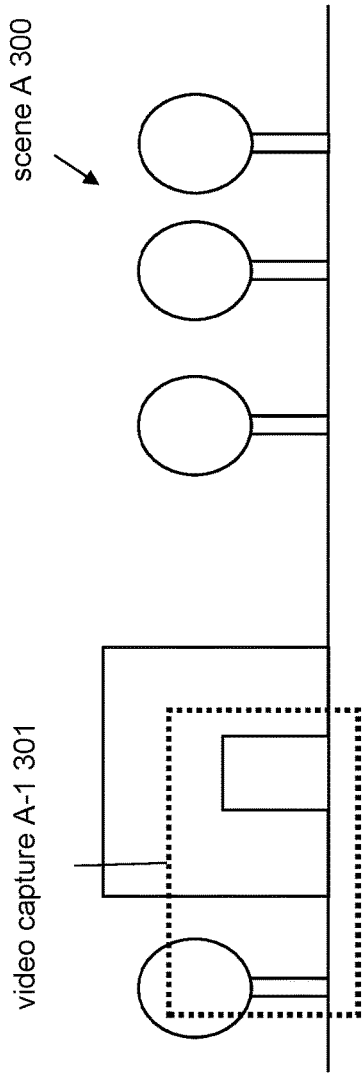
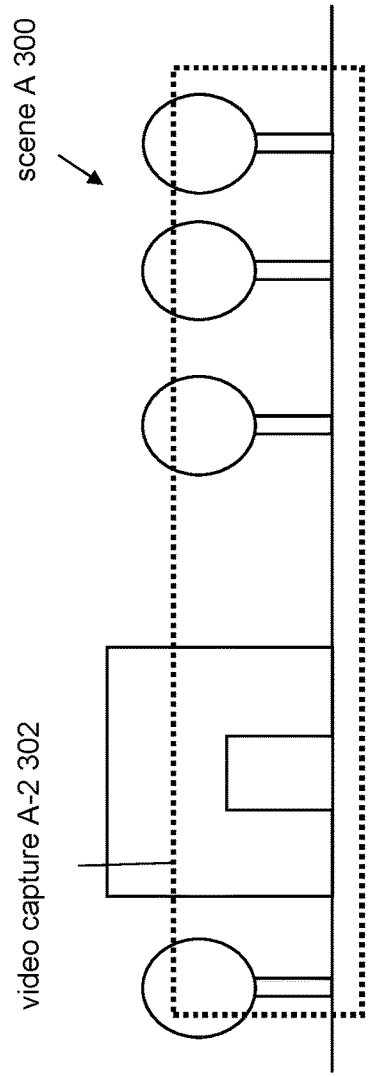

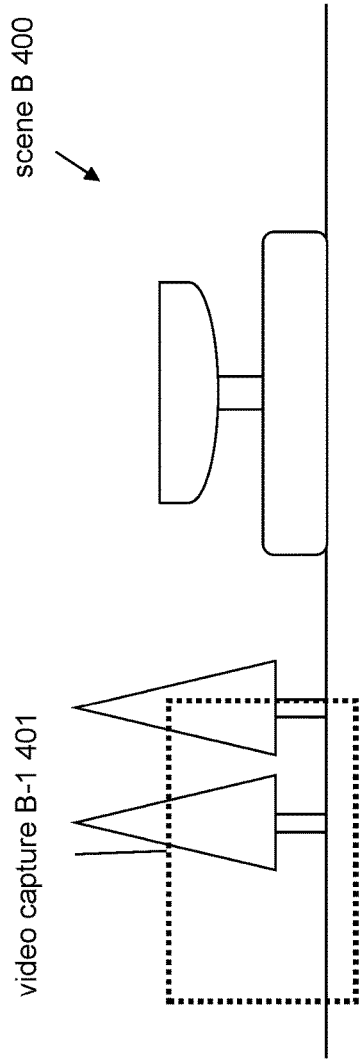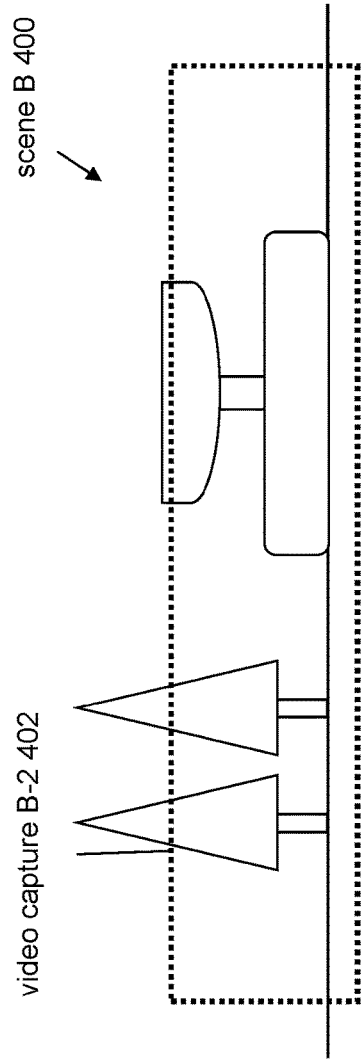

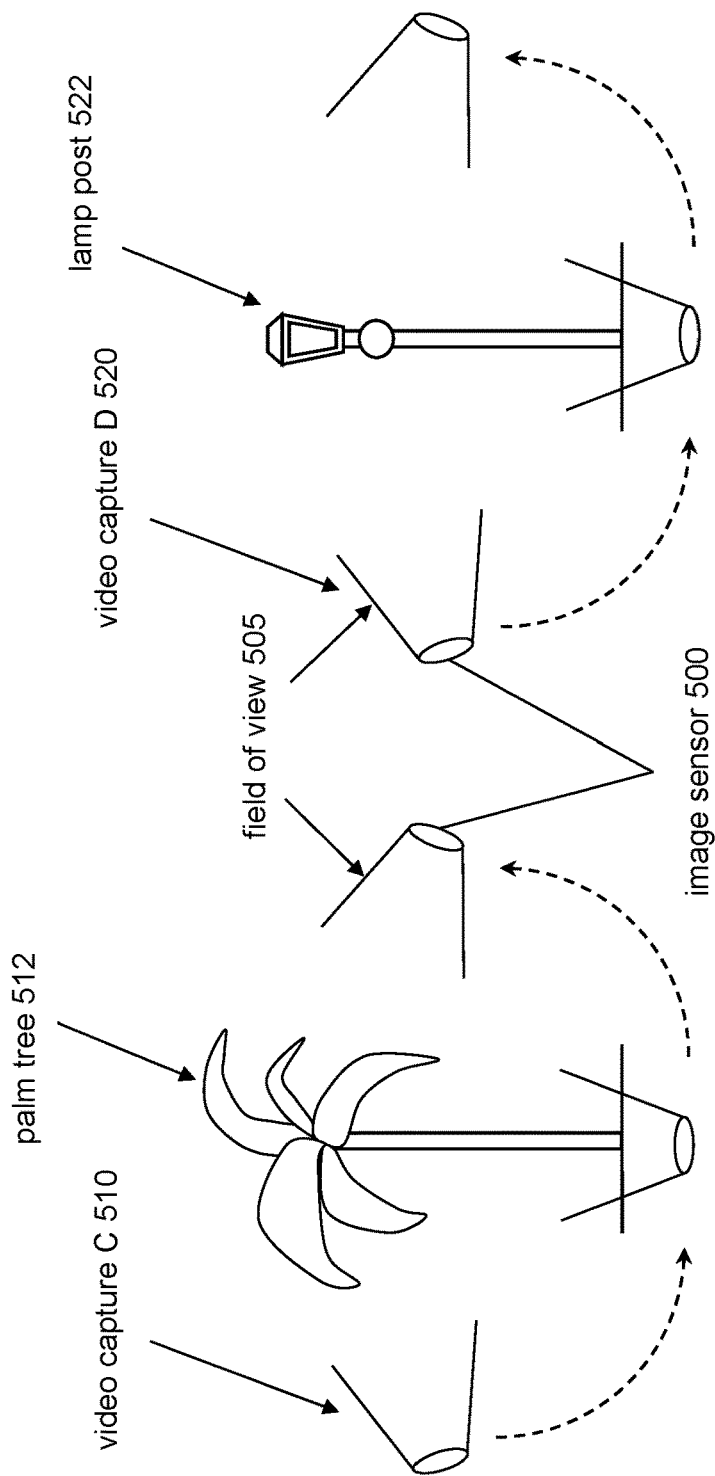

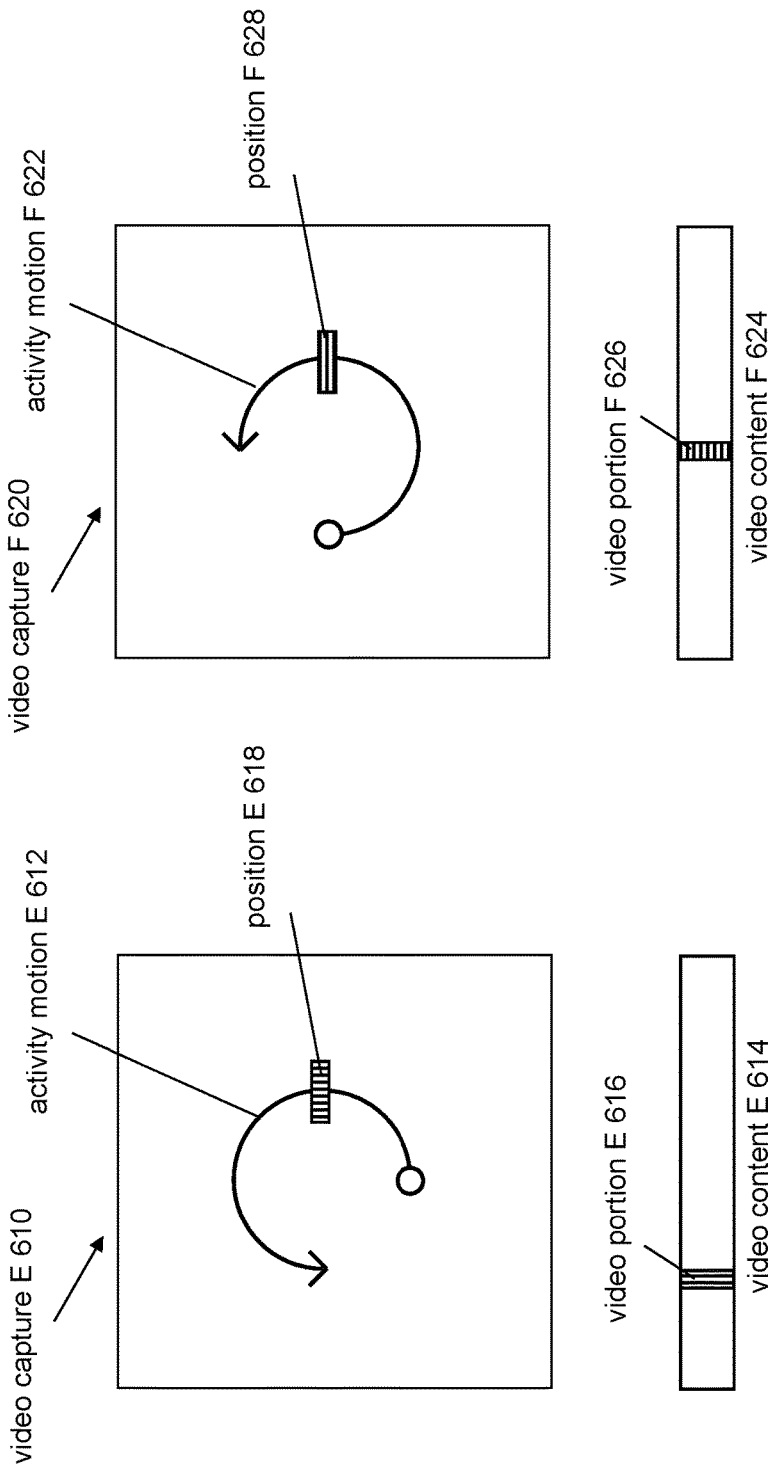

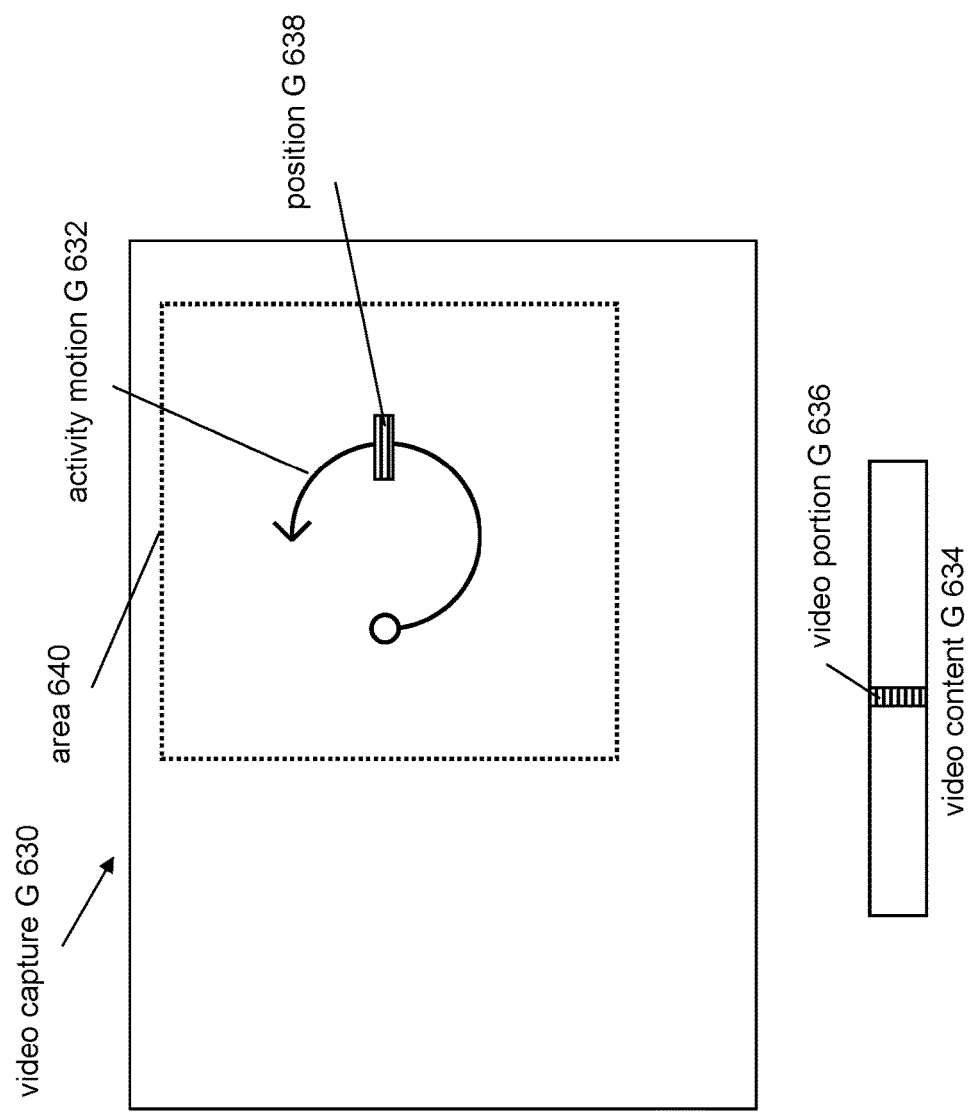

SYSTEMS AND METHODS FOR EDITING VIDEOS BASED ON MOTION

FIELD

This disclosure relates to editing videos based on matching motion represented within the videos.

BACKGROUND

Different video clips may have portions with matching motion. Matching motion may include activity motion (motion of activity captured within the videos) capture motion (motion of image sensor(s) that captured with videos), and/or other motion. A user may wish to create a video composition that joins the different video clips with portions with matching motion. Manually identifying and editing the video clips to create such a video composition may be time consuming.

SUMMARY

This disclosure relates to editing videos based on motion. First video information defining first video content and second video information defining second video content may be accessed. Motion within the first video content and/or motion within the second video content may be assessed. A match between the motion assessed within the first video content and the motion assessed within the second video content may be determined. The match may include a first set of video frames within the first video content and a second set of video frames within the second video content within which the matching motion is present. A first video portion of the first video content and a second video portion of the second video content may be identified based on the match. The first video portion may include one or more frames of the first set of video frames and the second video portion may include one or more frames of the second set of video frames. The first video portion and the second video portion may be concatenated such that the concatenation of the first video portion and the second video portion results in a transition between the first video portion and the second video portion in which continuity of motion may be achieved.

A system that edits videos based on motion may include one or more of physical storage media, processors, and/or other components. The physical storage media may store video information defining video content. Video content may refer to media content that may be consumed as one or more videos. Video content may include one or more videos stored in one or more formats/container, and/or other video content. The video content may have a progress length. In some implementations, the video content may include one or more of spherical video content, virtual reality content, and/or other video content.

The processor(s) may be configured by machine-readable instructions. Executing the machine-readable instructions may cause the processor(s) to facilitate editing videos based on motion. The machine-readable instructions may include one or more computer program components. The computer program components may include one or more of an access component, a motion component, a match component, a video portion component, a concatenation component, and/or other computer program components.

The access component may be configured to access the video information defining one or more video content and/or other information. The access component may access first video information defining first video content, second video information defining second video content, and/or other video information defining other video content. The access component may access video information from one or more storage locations. The access component may be configured to access video information defining one or more video content during acquisition of the video information and/or after acquisition of the video information by one or more image sensors.

The motion component may be configured to assess motion within one or more video content. The motion component may assess motion within the first video content, the second video content, and/or other video content.

In some implementations, the motion assessed within one or more video content may include capture motion of the video content. In some implementations, capture motion may include one or more of zoom, pan, tilt, dolly, truck, and/or pedestal of capture of the video content by one or more image sensors. In some implementations, capture motion may include a direction of gravity on one or more image sensors during the capture of the video content.

In some implementations, the motion assessed within one or more video content may include activity motion within the video content. In some implementations, activity motion may include one or more of linear speed, angular speed, linear acceleration, angular acceleration, linear direction, and/or angular direction of one or more moving activities captured within the video content.

The match component may be configured to determine one or more matches between the motions assessed within two or more video content. The match component may determine one or more matches between the motion assessed within the first video content and the motion assessed within the second video content. A match may include a first set of video frames within the first video content and a second set of video frames within the second video content within which the matching motion is present.

In some implementations, the first video content may include a capture of a first event type and/or other event types and the second video content may include a capture of a second event type and/or other event types. The match component may determine the match(es) between the motion assessed within the first video content and the motion assessed within the second video content regardless of a match between the first event type and the second event type. The match component may determine the match(es) between the motion assessed within the first video content and the motion assessed within the second video content further based on a match between the first event type and the second event type.

The video portion component may be configured to identify one or more video portions based on the match. The video portion component may identify a first video portion of the first video content and a second video portion of the second video content based on the match. The first video portion may include one or more frames of the first set of video frames. The second video portion may include one or more frames of the second set of video frames.

The concatenation component may be configured to concatenate two or more video portions. The concatenation component may concatenate the first video portion and the second video portion such that the one or more frames of the first set of video frames are adjacent to the one or more frames of the second set of video frames. The concatenation of the first video portion and the second video portion may result in a transition between the first video portion and the second video portion in which continuity of motion may be achieved.

In some implementations, the concatenation component may be configured to determine an order of two or more video portions for the concatenation of the video portions. The concatenation component may determine an order of the first video portion and the second video portion for the concatenation of the first video portion and the second video portion.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3A illustrates an example video capture without camera motion.

FIG. 3B illustrates an example video capture with camera motion.

FIG. 4A illustrates an example video capture without camera motion.

FIG. 4B illustrates an example video capture with camera motion.

FIGS. 5A-5B illustrate example video captures with camera motion.

FIGS. 6A-6C illustrate example video captures with activity motion.

DETAILED DESCRIPTION

Figure 1:
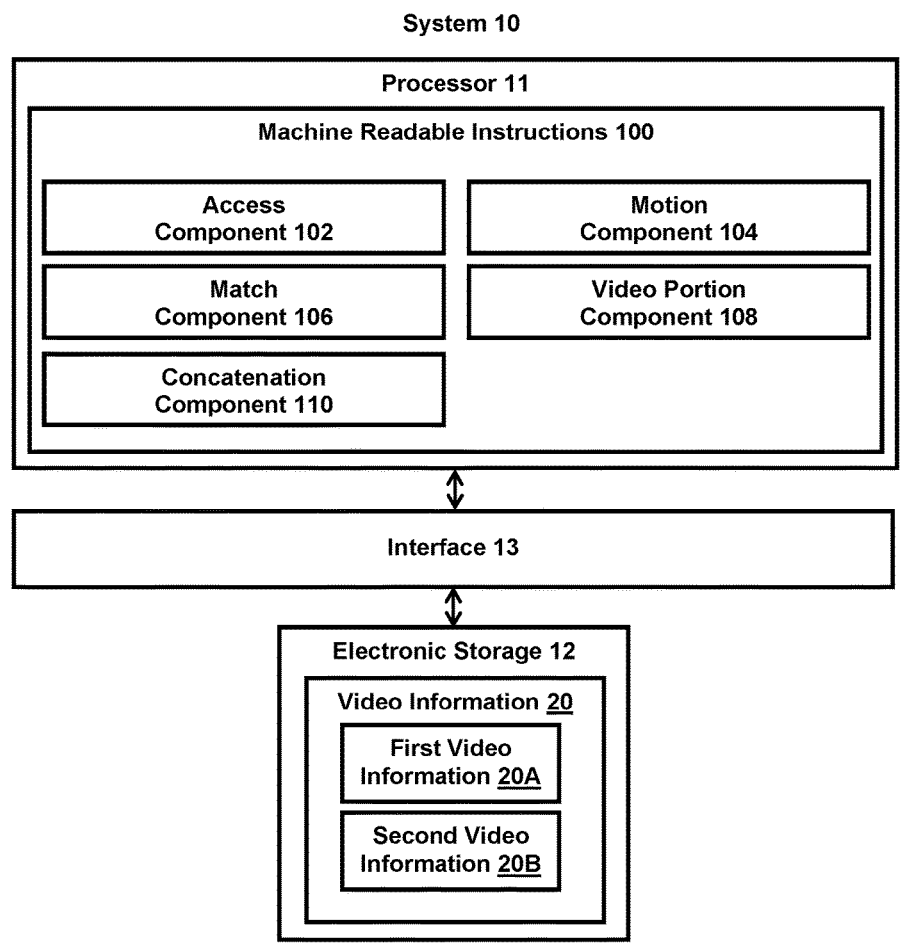
FIG. 1 illustrates a system that edits videos based on motion.

FIG. 1 illustrates system 10 for editing videos based on motion. System 10 may include one or more of processor 11, electronic storage 12, interface 13 (e.g., bus, wireless interface), and/or other components. First video information 20A defining first video content, second video information 20B defining second video content, and/or other video information defining other video content may be accessed by processor 11. Motion within the first video content and/or motion within the second video content may be assessed. A match between the motion assessed within the first video content and the motion assessed within the second video content may be determined. The match may include a first set of video frames within the first video content and a second set of video frames within the second video content within which the matching motion is present. A first video portion of the first video content and a second video portion of the second video content may be identified based on the match. The first video portion may include one or more frames of the first set of video frames and the second video portion may include one or more frames of the second set of video frames. The first video portion and the second video portion may be concatenated such that the concatenation of the first video portion and the second video portion results in a transition between the first video portion and the second video portion in which continuity of motion may be achieved.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to video information, video content, motion within video content, video frames, video portions, concatenation of video portions, and/or other information.

Electronic storage 12 may store video information 20 defining one or more video content. Video information 20 may include first video information 20A defining first video content, second video information 20B defining second video content, and/or other video information defining other video content. Video content may refer to media content that may be consumed as one or more videos. Video content may include one or more videos stored in one or more formats/container, and/or other video content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Referring to FIG. 1, processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate editing videos based on motion. Machine readable instructions 100 may include one or more computer program components. Machine readable instructions 100 may include one or more of access component 102, motion component 104, match component 106, video portion component 108, concatenation component 110 and/or other computer program components.

Access component 102 may be configured to access video information defining one or more video content and/or other information. Access component 102 may access video information from one or more storage locations. A storage location may include electronic storage 12, electronic storage of one or more image sensors (not shown in FIG. 1), and/or other locations. For example, access component 102 may access video information 20 stored in electronic storage 12. Access component 102 may access first video information 20A defining first video content, second video information 20B defining second video content, and/or other video information defining other video content.

Access component 102 may be configured to access video information defining one or more video content during acquisition of the video information and/or after acquisition of the video information by one or more image sensors. For example, access component 102 may access video information defining a video while the video is being captured by one or more image sensors. Access component 102 may access video information defining a video after the video has been captured and stored in memory (e.g., electronic storage 12).

Motion component 104 may be configured to assess motion within one or more video content and/or other information. Motion component 104 may assess motion within the first video content, the second video content, and/or other video content. Motion component 104 may assess motion within video content based on motion vector extraction and/or other information. Motion vectors may represent motion of one or more visuals captured within individual video frames. Motion may exist within video frames due to motion of image sensor(s) that captured the video frames and/or due to motion of a thing captured within the video frames. Motion vectors may be determined using one or more of block-matching algorithm, phase correlation and frequency domain methods, pixel recursive algorithms, optical flow, feature detection, and/or other criteria matching methods.

Motion vector may represent movement of one or more pixels and/or groupings of pixels between video frames of the video content. Motion vector may represent movement of an object captured within the video content from a location in a video frame to another location in another video frame (and to subsequent locations in subsequent frames). Motion vector may be characterized by direction(s) of motion (linear and/or angular) and magnitude(s) of motion.

Motion component 104 may assess motion within an entire video frame (e.g., combination of motion vectors associated with portions of the video frame) or motion within particular portion(s) of the video frame. For example, video frames of video content may be divided into multiple portions (e.g., macro blocks) and motion vector of individual portions may be determined. Motion vectors of the individual portions may be combined (e.g., summed, square summed, averaged) to determine the motion for the entire video frame. Individual video frames of the video content may be associated with global motion (e.g., motion of the frame as a whole) and/or local motion (motion of a portion of the frame).

Motion component 104 may assess motion within video content based on video compression and/or other information. Video compression of video content may result in video frames that include information for entire viewable dimensions of the video frames (e.g., I-frame) and video frames that include information for portions of the viewable dimensions of the video frames (e.g., P-frame, B-frame). A video frame may include information regarding changes in the video frames from prior frames, subsequent frames, or both. Information regarding changes in the video frames may characterize/defined by the motion of the video content. Motion component 104 may use the information regarding changes in the video frame to assess the motion of the video content.

Motion assessed within video content may include capture motion, activity motion, and/or other motion. Capture motion may refer to motion/operation of image sensor(s) that captured the video content. Capture motion may include motion/operation of the image sensor(s) at a time, over a duration of time, at a location, or over a range of locations. As non-limiting examples, capture motion may include one or more of zoom, pan, tilt, dolly, truck, pedestal, and/or other capture of the video content by the image sensor(s). In some implementations, capture motion may include a direction of gravity on the image sensor(s) during the capture of the video content. The direction of gravity may indicate the positioning of the image sensor(s) with respect to gravity during capture of the video content (e.g., upright, tilted, flipped). In some implementation, capture motion of the video content may be assessed further based on movement sensors (e.g., accelerometer, gyroscope) that measure the motion of the image sensor(s).

FIGS. 3A-3B illustrate example video content captures at scene A 300. As shown in FIG. 3A, video capture A-1 301 may include capture of a portion of scene A 300. Video capture A-1 301 may include video content capture by one or more image sensors without any capture motion—i.e., video content in video capture A-1 301 is captured by still image sensor(s). The dotted rectangle of video capture A-1 301 may represent the field of view of the image sensor(s). As shown in FIG. 3B, video capture A-2 302 may include capture of a larger portion of scene A 300 than video capture A-1 301. Video capture A-2 302 may include video content capture by one or more image sensors with capture motion—i.e., video content in video capture A-2 302 may be captured by moving image sensor(s). The dotted rectangle of video capture A-2 302 may represent the combined field of view of the moving image sensor(s) (e.g., field of view of the image sensor(s) as the image sensor(s) are panned/trucked to the right) during capture of the video content.

FIGS. 4A-4B illustrate example video content captures at scene B 400. As shown in FIG. 4A, video capture B-1 401 may include capture of a portion of scene B 400. Video capture B-1 401 may include video content capture by one or more image sensors without any capture motion—i.e., video content in video capture B-1 401 is captured by still image sensor(s). The dotted rectangle of video capture B-1 401 may represent the field of view of the image sensor(s). As shown in FIG. 4B, video capture B-2 402 may include capture of a larger portion of scene B 400 than video capture B-1 401. Video capture B-2 402 may include video content capture by one or more image sensors with capture motion—i.e., video content in video capture B-2 402 may be captured by moving image sensor(s). The dotted rectangle of video capture B-2 402 may represent the combined field of view of the moving image sensor(s) (e.g., field of view of the image sensor(s) as the image sensor(s) are panned/trucked to the right) during capture of the video content.

FIG. 5A illustrate an example video content capture of palm tree 512 (video capture C 510). Video capture C 510 may include video content capture by image sensor 500, which has field of view 505. Video capture C 510 may include video content capture by image sensor 500 with capture motion—i.e., video content in video capture C 510 may be captured by moving image sensor 500 from left of palm tree 512, to front of palm tree 512, to right of palm tree 512, with the field of view 500 of image sensor 500 centered on top of palm tree 512.

FIG. 5B illustrates an example video content capture of lamp post 522 (video capture D 520). Video capture D 520 may include video content capture by image sensor 500, which has field of view 505. Video capture D 520 may include video content capture by image sensor 500 with a capture motion—i.e., video content in video capture D 520 may be captured by moving image sensor 500 from left of lamp post 522, to front of lamp post 522, to lamp post 522, with the field of view 500 of image sensor 500 centered on top of lamp post 522.

Activity motion may refer to motion of activity within the video content (activity captured within the field of view of image sensor(s)). Activity motion may include motion of one or more activities at a time, over a duration of time, at a location, or over a range of locations. As non-limiting examples, activity motion may include one or more of linear speed, angular speed, linear acceleration, angular acceleration, linear direction, and/or angular direction of one or more moving activities captured within the video content. In some implementations, activity motion may include a direction of gravity on the image sensor(s) during the capture of the video content. The direction of gravity may indicate the positioning of the image sensor(s) with respect to gravity during capture of the video content (e.g., upright, tilted, flipped).

FIG. 6A illustrates an example video content capture of a moving object (video capture E 610). Video capture E 610 may include video content capture of an object moving in a circular motion (activity motion E 612). The video content may include capture of the object moving in a counter-clock direction from the bottom of the circle to the left of the circle. Video content E 614 may represent the video content captured in video capture E 610. Video portion E 616 may represent the portion (one or more video frames) of video content E 614 at which the object was located in position E 618.

FIG. 6B illustrates an example video content capture of a moving object (video capture F 620). Video capture F 620 may include video content capture of an object moving in a circular motion (activity motion F 622). The video content may include capture of the object moving in a counter-clock direction from the left of the circle to the top of the circle. Video content F 624 may represent the video content captured in video capture F 620. Video portion F 626 may represent the portion (one or more video frames) of video content F 624 at which the object was located in position F 628.

FIG. 6C illustrates an example video content capture of a moving object (video capture G 630). Video capture G 630 may include video content capture of an object moving in a circular motion (activity motion G 632). The video content may include capture of the object moving in a counter-clock direction from the left of the circle to the top of the circle. Video content G 634 may represent the video content captured in video capture G 630. Video portion G 636 may represent the portion (one or more video frames) of video content G 634 at which the object was located in position G 638. Video content G 634 may be characterized by a larger capture field of view than video content E 614 or video content F 624.

Match component 106 may be configured to determine one or more matches between the motions assessed within two or more video content. Match component 106 may determine one or more matches between the motion assessed within one video content (e.g., first video content) and motion assessed within another video content (e.g., second video content). In some implementations, match component 106 may determine one or more matches between the motions assessed within a single video content (matches between motions assessed within different portions of the video content). A match may include a set of video frames (one or more video frames) within one video content and a set of video frames (one or more video frames) within another video content within which the matching motion is present. For example, a match may include a first set of video frames within the first video content and a second set of video frames within the second video content within which the matching motion is present. In some implementations, a match may include a first set of video frames and a second set of video frames within one video content.

Match component 106 may determine match(es) between motions assessed within video content based on magnitude(s) and/or direction(s) of the assess motions. For example, referring to FIGS. 3B and 4B, match component 106 may determine match(es) between motions assessed within video content captured by video capture A-2 302 and video content captured by video captured B-2 402 based on the magnitudes (e.g., 100 pixels per seconds) of the capture motions of the image sensor(s) and/or the direction (e.g., movement to the right) of the capture motions of the image sensor(s). Referring to FIGS. 5A-5B, match component 106 may determine match(es) between motions assessed within video content captured by video capture C 510 and video content captured by video captured D 520 based on the magnitudes of the capture motions of the image sensor(s) and/or the direction (e.g., rotation to the right) of the capture motions of the image sensor(s). Referring to FIGS. 6A-6C, match component 106 may determine match(es) between motions assessed within video content captured by video capture E 610, video content captured by video capture F 620, and/or video content captured by video captured G 630 based on the magnitudes of the activity motions and/or the direction (e.g., counter-clockwise movement) of the activity motions within the video content.

Match component 106 may determine match(es) between motions assessed within video content based on magnitude and/or direction of local motion and/or global motion. Match component 106 may determine match(es) based on exact match(es) in motion (e.g., exact matches in direction and/or magnitude) or based on proximate match(es) in motion (e.g., match determined based on direction and/or magnitude not deviating by a certain percentage or amount).

In some implementations, match component 106 may determine match(es) between motions assessed within video content based on matches in motion curves. Video content may include motion that changes/does not change over the range of duration/video frames. A motion curve may represent motion (direction and/or magnitude) over a range of duration/video frames. Match component 106 may determine match(es) between motions based on matches in changes/lack of changes of motions assessed within video content over a range of duration/video frames. For example, match component 106 may determine match(es) based on a motion curve of video content characterized by capture of an image sensor moving underneath and out of an arch and a motion curve of video content characterized by capture of an image sensor moving underneath and out of a different arch (or other structure).

Video content may include a capture of a particular event type. An event type may refer to a type of scene, activity, and/or occurrence captured within the video content. An event type may correspond to a portion of video content or entire video content. For example, the first video content may include a capture of a first event type and/or other event types and the second video content may include a capture of a second event type and/or other event types. In some implementations, match component 106 may determine the match(es) between the motion assessed within the first video content and the motion assessed within the second video content further based on a match between the first event type and the second event type. For example, match component 106 may determine match(es) between motions assessed within two video content based on both video content including a capture of a skating activity, including a capture of a holiday party, and/or other matches in event type.

In implementations, match component 106 may determine the match(es) between the motion assessed within the first video content and the motion assessed within the second video content based on/regardless of a non-match between the first event type and the second event type. For example, match component 106 may determine match(es) between motions assessed within two video content based on/despite difference in type of events captured within the two video content (e.g., boating activity versus holiday party). Determining matches regardless of the match between event types may provide for a different feel of the matched video content than video content matched based on matched event types.

Video content may include a capture of a particular object/thing. A capture of the particular thing/object may correspond to a portion of video content or entire video content. For example, the first video content may include a capture of a first object/thing and/or other objects/things and the second video content may include a capture of a second object/thing and/or other objects/things. In some implementations, match component 106 may determine the match(es) between the motion assessed within the first video content and the motion assessed within the second video content further based on a match between the first object/thing and the second object/thing. For example, match component 106 may determine match(es) between motions assessed within two video content based on both video content including a capture of a particular person, animal, building, and/or other objects/things.

In some implementations, match component 106 may determine the match(es) between the motion assessed within the first video content and the motion assessed within the second video content based on/regardless of a non-match between the first object/thing and the second object/thing. For example, match component 106 may determine match(es) between motions assessed within two video content based on/despite difference in type of object/thing captured within the two video content (e.g., palm tree versus lamp post). Determining matches regardless of the match between captured objects/thing may provide for a different feel of the matched video content than video content matched based on matched object/thing.

In some implementations, match component 106 may determine match(es) between motions assessed within video content based on the direction of gravity on one or more image sensors during the capture of the video content. For example, a direction of motion in one video content may be matched with a direction of motion in another video content based on match in the direction of gravity on the image sensor(s) that captured both video content. Determining matches based on the direction of gravity may enable matching of video content including same motions with respect to ground. Determining matches based on the direction of gravity may enable matching of video content captured using the same image sensor orientation of capture with respect to ground. In some implementations, match component 106 may determine match(es) between motions assessed within video content regardless of the direction of gravity on one or more image sensors during the capture of the video content. Determining matches regardless of the match between the direction of gravity on the image sensor(s) during the capture of the video content may provide for a different feel of the matched video content than video content matched based on the direction of gravity on the image sensor(s).

Video portion component 108 may be configured to identify one or more video portions based on the match and/or other information. The video portions identified by video portion component 108 may include one or more frames of the set of video frames within which the matching motion is present. For example, video portion component 108 may identify a first video portion of the first video content and a second video portion of the second video content based on the match and/or other information. The first video portion may include one or more frames of the first set of video frames and/or other frames. The second video portion may include one or more frames of the second set of video frames and/or other frames. In some implementations, the video portions identified by video portion component 108 may include a minimum number of video frames from the set of video frames within which the matching motion is present. For example, for video content captured at 30 frames per second, the video portions identified by video portion component 108 may include five or more frames from the set of video frames within which the matching motion is present. Other numbers of video frames are contemplated.

Figure 7A:
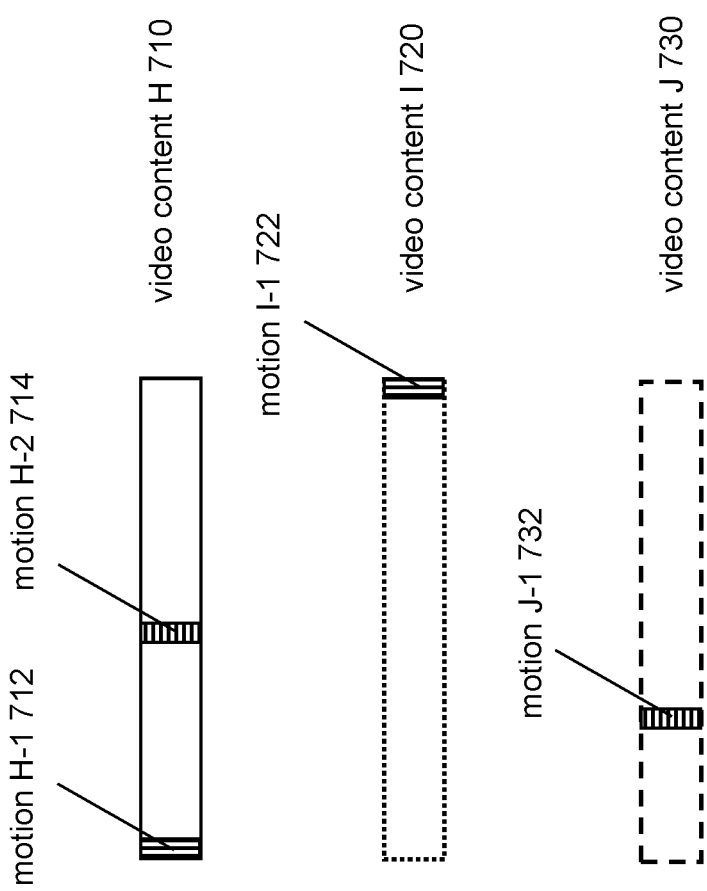
FIG. 7A illustrates example video content with assessed motion.

For example, FIG. 7A illustrates example video content and motion assessed within video content. Video content H 710 may include motion H-1 712, motion H-2 714, and/or other motions. Video content I 720 may include motion I-1 722 and/or other motions. Video content J 730 may include motion J-1 732 and/or other motions. Motion H-1 712 may match motion I-1 722. Motion H-2 714 may match motion J-1 732. Based on the match between motion I-1 722 and motion H-1 712, video portion component 108 may identify video content I 720 (or some portion of video content I 720 including at least some of the portion including motion I-1 722). Based on the match between motion H-1 712 and motion I-1 722, video portion component 108 may identify video content H 710 (or some portion of video content H 710 including at least some of the portion including motion H-1 712). Based on the match between motion J-1 732 and motion H-2 714, video portion component 108 may identify portion of video content J 730 including and following at least some of the portion including motion J-1 732. Based on the match between motion H-2 714 and motion J-1 732, video portion component 108 may identify portion of video content H 710 including and preceding at least some of the portion including motion H-2 714. Other identification of portions of video content are contemplated.

Concatenation component 110 may be configured to concatenate two or more video portions. Concatenation component 110 may concatenate two or more video portions such that one or more frames of the set of video frames within which the matching motion is present in one video content is adjacent to one or more frames of the set of video frames within which the matching motion is present in another video content. For example, concatenation component 110 may concatenate the first video portion and the second video portion such that the one or more frames of the first set of video frames are adjacent to the one or more frames of the second set of video frames. The concatenation of the first video portion and the second video portion may result in a transition between the first video portion and the second video portion in which continuity of motion may be achieved.

Figure 7B:
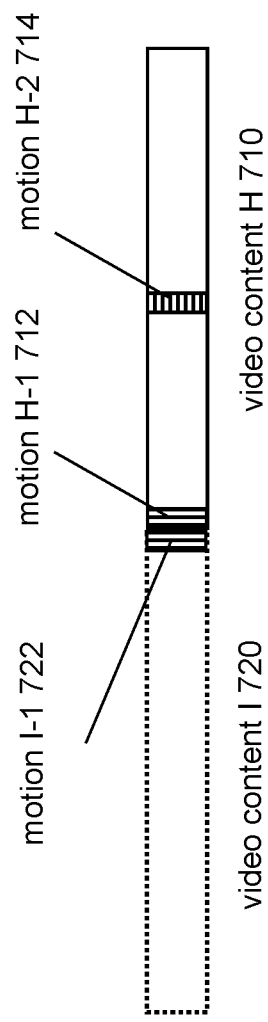
FIGS. 7B-7C illustrate example concatenation of video portions based on match between assessed motions.
Figure 7C:
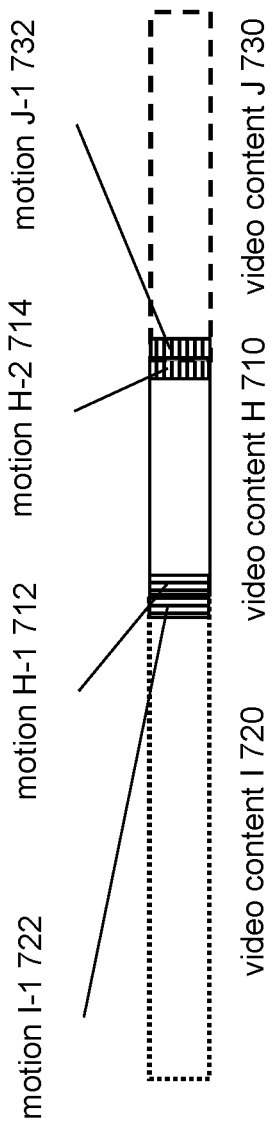

FIGS. 7B and 7C illustrate example concatenations of video portions. In FIG. 7B, video content I 720 may be concatenated with video content H 710 such that the concatenation results in a transition between video content I 720 and video content H 710 in which continuity of motion may be achieved. The continuity of motion may be achieved from the portion of video content I 720 including motion I-1 722 being adjacent to the portion of video content H 710 including motion H-1 712.

In FIG. 7C, video content I 720 may be concatenated with a portion of video content H 710 and the portion of video content H 710 may be concatenated with a portion of video content J 730 such that the concatenation results in a transition between video content I 720 and the portion of video content H 710 in which continuity of motion may be achieved, and a transition between the portion of video content H 710 and the portion of video content J 730 in which continuity may be achieved. The continuity of motion may be achieved from the portion of video content I 720 including motion I-1 722 being adjacent to the portion of video content H 710 including motion H-1 712, and from the portion of video content H 710 including motion H-2 714 being adjacent to the portion of video content J 730 including motion J-1 732.

In some implementations, concatenation component 110 may be configured to determine an order of two or more video portions for the concatenation of the video portions. For example, concatenation component 110 may determine an order of the first video portion and the second video portion for the concatenation of the first video portion and the second video portion. Referring to FIG. 7B, concatenation component 110 may determine the order of the video portions such that video content I 720 comes before video content H 710. Referring to FIG. 7C, concatenation component 110 may determine the order of the video portions such that video content I 720 comes first, a portion of video content H 710 comes second, and a portion of video content J 730 comes third.

In some implementations, concatenation component 110 may be configured to modify one or more video portions for concatenations. Concatenation component 110 may modify one or more video portion such that the motion within the modified video portion better matches the motion for concatenation. For example, a motion in one video portion may proximately match (e.g., in direction and/or magnitude) a motion in another video portion for concatenation. Concatenation component 110 may modify one or more both of the video portions such that the motion within the two video portions are better matched. Modification of the video portion(s) may include one or more changes in perceived speed with which the video portion is presented during playback, changes in dimensional portions of the video portion that is presented during playback (e.g., change in dimensional area presented by zoom, crop, rotation), and/or other changes. Modification of the video portion(s) may include additions of one or more transitions (e.g., crossfade, masking) using frames from the two video portions such that the motion within the two video portions are better matched.

Referring to FIGS. 3B and 4B, video capture A-2 302 may include an image sensor panning/trucking to the right that is 10% slower than the image sensor panning/trucking to the right in video capture B-2 402. A portion of the video content captured by video capture A-302 may be modified such that the perceived speed with which the video portion is presented during playback is quickened (e.g., by 10%). As another example, a portion of the video content captured by video capture A-302 and a portion of the video content captured by video captured B-2 402 may be modified such that the perceived speed with which the portion of the video content captured by video capture A-302 is presented during playback is quickened (e.g., by 5%) and the perceived speed with which the portion of the video content captured by video capture A-302 is presented during playback is slowed down (e.g., by 5%). Other modification of perceived speed of playback is contemplated.

Referring to FIGS. 6B and 6C, video capture F 620 may include activity motion F 622 and video capture G 630 may include activity motion G 632. A portion of video content G 634 including activity motion G 632 may be modified such that the dimensional portions of video content G 634 that is presented during playback is changed. For example, concatenation component 110 may change the dimensional portions of video content G 634 that is presented during playback to area 640 (e.g., via cropping, zooming) such that concatenation of a portion of video content F 624 and a portion of video content 634 is characterized by a continuity of motion that is locally matched in location of presentation.

In some implementations, concatenation of video portions may be synchronized to one or more musical tracks. Video portions may be identified and/or concatenated such that transitions between different video portions/video contents occur with one or more particular sounds in the musical track(s). For example, different lengths of video portions may be identified so that the transitions between the video portions occur with the occurrence of one of more of a beat, a tempo, a rhythm, an instrument, a volume, a vocal, a chorus, a frequency, a style, a start, an end, and/or other sounds occurring within the music track. Video portions may be identified, concatenated, and/or ordered such that video portions of differing motion intensity (amount of magnitude and/or direction) may occur with portions of a musical track having different musical intensity (e.g., energy, volume, amplitude). For example, for a high energy (e.g., loud volume, fast tempo) portion of the musical track, a video portion with high motion (e.g., large motion magnitude) may be presented. Other synchronization of video portions to musical tracks area contemplated.

The systems/methods disclosed herein may enable generation of video summary including video portions that are connected by motion captured within the video portions. Such generation of video summary may provide for continuation of motion from one video portion (video clip) to another. The identification and arrangement of video portions may be unrelated to the content captured within the video portions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, video content may include one or more of spherical video content, virtual reality content, and/or other video content. Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
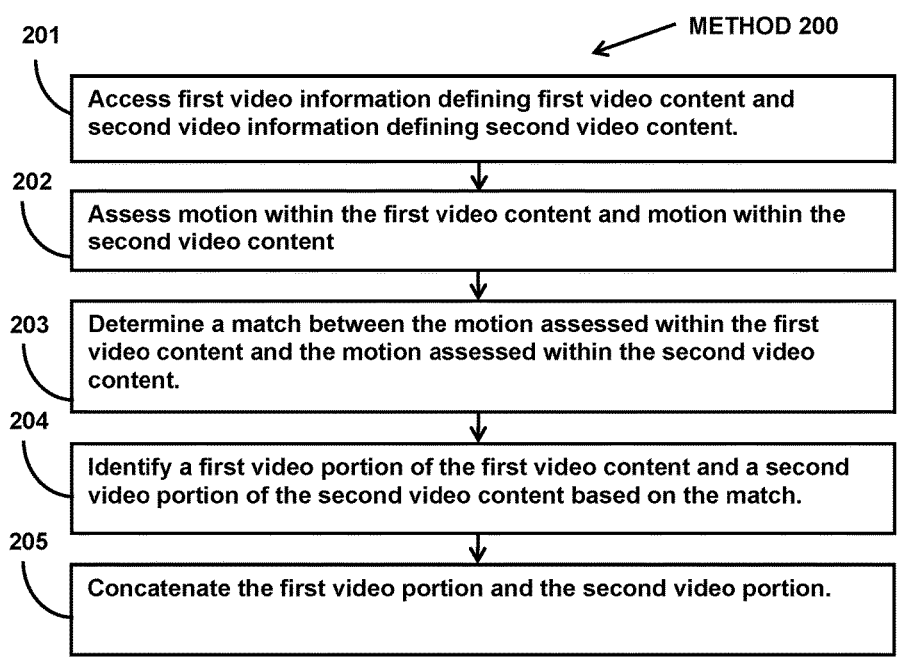
FIG. 2 illustrates a method for editing videos based on motion.

FIG. 2 illustrates method 200 for editing videos based on motion. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, first video information defining first video content and second video information defining second video content may be accessed. In some implementation, operation 201 may be performed by a processor component the same as or similar to access component 102 (Shown in FIG. 1 and described herein).

At operation 202, motion within the first video content and motion within the second video content may be assessed. In some implementations, operation 202 may be performed by a processor component the same as or similar to motion component 104 (Shown in FIG. 1 and described herein).

At operation 203, a match between the motion assessed within the first video content and the motion assessed within the second video content may be determined. The match may including a first set of video frames within the first video content and a second set of video frames within the second video content within which the matching motion is present. In some implementations, operation 203 may be performed by a processor component the same as or similar to match component 106 (Shown in FIG. 1 and described herein).

At operation 204, a first video portion of the video content and a second video portion of the second video content may be identified based on the match. The first video portion may include one or more frames of the first set of video frames. The second video portion may include one or more frames of the second set of video frames. In some implementations, operation 204 may be performed by a processor component the same as or similar to video portion component 108 (Shown in FIG. 1 and described herein).

At operation 205, the first video portion and the second video portion may be concatenated. The first video portion and the second video portion may be concatenated such that one or more frames of the first set of video frames are adjacent to one or more frames of the second set of video frames. The concatenation of the first video portion and the second video portion may result in a transition between the first video portion and the second video portion in which continuity of motion may be achieved. In some implementations, operation 205 may be performed by a processor component the same as or similar to concatenation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for editing videos based on motion, the system comprising:
    one or more physical processors configured by machine-readable instructions to:
        access first video information defining first video content;
        access second video information defining second video content;
        assess motion within the first video content;
        assess motion within the second video content;
        determine a match between the motion assessed within the first video content and the motion assessed within the second video content, the match including a first set of video frames within the first video content and a second set of video frames within the second video content within which the matching motion is present;
        identify a first video portion of the first video content based on the match, the first video portion including one or more frames of the first set of video frames;
        identify a second video portion of the second video content based on the match, the second video portion including one or more frames of the second set of video frames; and
        concatenate the first video portion and the second video portion such that the one or more frames of the first set of video frames are adjacent to the one or more frames of the second set of video frames, the concatenation of the first video portion and the second video portion resulting in a transition between the first video portion and the second video portion in which continuity of motion is achieved.

2. The system of claim 1, wherein the motion assessed within the first video content includes capture motion of the first video content.

3. The system of claim 2, wherein the capture motion includes one or more of zoom, pan, tilt, dolly, truck, and/or pedestal of capture of the first video content by one or more image sensors.

4. The system of claim 3, wherein the capture motion further includes a direction of gravity on the one or more image sensors during the capture of the first video content.

5. The system of claim 1, wherein the motion assessed within the first video content includes activity motion within the first video content.

6. The system of claim 5, wherein the activity motion includes one or more of linear speed, angular speed, linear acceleration, angular acceleration, linear direction, and/or angular direction of a moving activity captured within the first video content.

7. The system of claim 1, wherein:
    the first video content includes capture of a first event type;
    the second video content includes capture of a second event type; and
    the match between the motion assessed within the first video content and the motion assessed within the second video content is determined regardless of a match between the first event type and the second event type.

8. The system of claim 1, wherein:
    the first video content includes capture of a first event type;
    the second video content includes capture of a second event type; and
    the match between the motion assessed within the first video content and the motion assessed within the second video content is determined further based on a match between the first event type and the second event type.

9. The system of claim 1, wherein the one or more physical processors are further configured by machine-readable instructions to determine an order of the first video portion and the second video portion for the concatenation of the first video portion and the second video portion.

10. A method for editing videos based on motion, the method comprising:
    accessing first video information defining first video content;
    accessing second video information defining second video content;

assessing motion within the first video content;
assessing motion within the second video content;
determining a match between the motion assessed within the first video content and the motion assessed within the second video content, the match including a first set of video frames within the first video content and a second set of video frames within the second video content within which the matching motion is present;
identifying a first video portion of the first video content based on the match, the first video portion including one or more frames of the first set of video frames;
identifying a second video portion of the second video content based on the match, the second video portion including one or more frames of the second set of video frames; and
concatenating the first video portion and the second video portion such that the one or more frames of the first set of video frames are adjacent to the one or more frames of the second set of video frames, the concatenation of the first video portion and the second video portion resulting in a transition between the first video portion and the second video portion in which continuity of motion is achieved.

11. The method of claim 10, wherein the motion assessed within the first video content includes capture motion of the first video content.

12. The method of claim 11, wherein the capture motion includes one or more of zoom, pan, tilt, dolly, truck, and/or pedestal of capture of the first video content by one or more image sensors.

13. The method of claim 12, wherein the capture motion further includes a direction of gravity on the one or more image sensors during the capture of the first video content.

14. The method of claim 10, wherein the motion assessed within the first video content includes activity motion within the first video content.

15. The method of claim 14, wherein the activity motion includes one or more of linear speed, angular speed, linear acceleration, angular acceleration, linear direction, and/or angular direction of a moving activity captured within the first video content.

16. The method of claim 10, wherein:
the first video content includes capture of a first event type;
the second video content includes capture of a second event type; and
the match between the motion assessed within the first video content and the motion assessed within the second video content is determined regardless of a match between the first event type and the second event type.

17. The method of claim 10, wherein:
the first video content includes capture of a first event type;
the second video content includes capture of a second event type; and
the match between the motion assessed within the first video content and the motion assessed within the second video content is determined further based on a match between the first event type and the second event type.

18. The method of claim 10, further comprising determining an order of the first video portion and the second video portion for the concatenation of the first video portion and the second video portion.

* * * * *